(12) United States Patent
Hsieh et al.

(10) Patent No.: US 11,301,018 B2
(45) Date of Patent: Apr. 12, 2022

(54) UNINTERRUPTIBLE POWER SYSTEM

(71) Applicant: VOLTRONIC POWER TECHNOLOGY CORP., Taipei (TW)

(72) Inventors: Juor-Ming Hsieh, Taipei (TW); Yu-Cheng Lu, Taipei (TW)

(73) Assignee: VOLTRONIC POWER TECHNOLOGY CORP., Taipei (TW)

( * ) Notice: Subject to any disclaimer, the term of this patent is extended or adjusted under 35 U.S.C. 154(b) by 218 days.

(21) Appl. No.: 16/655,170

(22) Filed: Oct. 16, 2019

(65) Prior Publication Data
US 2020/0379536 A1 Dec. 3, 2020

(30) Foreign Application Priority Data

May 27, 2019 (TW) .................................. 108118218

(51) Int. Cl.
*G06F 1/30* (2006.01)
*H02J 9/06* (2006.01)
*G06F 3/041* (2006.01)
*H02J 7/02* (2016.01)
*H02J 7/00* (2006.01)

(52) U.S. Cl.
CPC .................. *G06F 1/30* (2013.01); *H02J 9/06* (2013.01); *G06F 3/041* (2013.01); *H02J 7/00* (2013.01); *H02J 7/025* (2013.01)

(58) Field of Classification Search
CPC .... G06F 1/30; G06F 3/041; H02J 7/34; H02J 9/06
See application file for complete search history.

(56) References Cited

U.S. PATENT DOCUMENTS

| D381,590 S | 7/1997 | Thoeni et al. |
| 5,793,627 A | 8/1998 | Caldes et al. |
| 5,995,400 A * | 11/1999 | Park ........................ H02J 9/00 363/146 |
| 6,894,622 B2 * | 5/2005 | Germagian ............... H02J 9/00 340/636.1 |
| D553,096 S | 10/2007 | Pfingsten et al. |
| D601,956 S | 10/2009 | Liu et al. |
| D607,843 S | 1/2010 | Borax |
| 8,528,264 B1 | 9/2013 | Thut et al. |
| 9,201,482 B2 * | 12/2015 | Lin ......................... G06F 1/305 |
| D748,504 S | 2/2016 | Rump |
| D771,565 S | 11/2016 | Saarivirta et al. |
| D781,250 S | 3/2017 | Cartwright et al. |

(Continued)

FOREIGN PATENT DOCUMENTS

| CN | 204537051 U | 8/2015 |
| CN | 106849340 A | 6/2017 |

(Continued)

*Primary Examiner* — Vincent H Tran
(74) *Attorney, Agent, or Firm* — Li & Cai Intellectual Property Office

(57) ABSTRACT

An uninterruptible power system includes a power converting engine, a UPS control circuit, and a control display circuit. The control display circuit is detachable, the control display circuit is detachably mounted on the UPS control circuit through at least a connection between the control output interface and the display input interface. When the control display circuit is detached from the UPS control circuit, the control display circuit communicates with the UPS control circuit in a wireless communication manner.

9 Claims, 4 Drawing Sheets

(56) References Cited

U.S. PATENT DOCUMENTS

| | | |
|---|---|---|
| 10,148,124 B1 | 12/2018 | Chang et al. |
| 2003/0033550 A1 | 2/2003 | Kuiawa et al. |
| 2003/0128507 A1* | 7/2003 | Metcalf .................. G06F 1/266 361/679.21 |
| 2005/0189817 A1* | 9/2005 | Johnson ................ G01R 31/40 307/39 |
| 2007/0171196 A1 | 7/2007 | Pfingsten |
| 2008/0238205 A1* | 10/2008 | Lee ........................ H02J 9/061 307/66 |
| 2008/0272655 A1 | 11/2008 | Vaughan et al. |
| 2009/0150818 A1* | 6/2009 | Bakhreiba ........... G06F 3/04883 715/771 |
| 2010/0213892 A1* | 8/2010 | DeSanctis ............ H02J 7/0044 320/107 |
| 2011/0226506 A1 | 9/2011 | Hamilton et al. |
| 2012/0185107 A1* | 7/2012 | Takehara ................ H02J 3/005 700/292 |
| 2014/0191705 A1* | 7/2014 | Takao .................. H02J 7/0068 320/103 |
| 2014/0285022 A1 | 9/2014 | Dao et al. |
| 2015/0355702 A1* | 12/2015 | Reade .................... H05K 5/023 713/340 |
| 2016/0111914 A1* | 4/2016 | Willard .................. H02J 9/061 307/66 |
| 2016/0197504 A1* | 7/2016 | Hsia ........................ H02J 7/00 307/23 |
| 2018/0006470 A1* | 1/2018 | Stacey .................. H01M 50/20 |
| 2018/0316215 A1 | 11/2018 | Lu et al. |
| 2019/0052121 A1 | 2/2019 | Lu et al. |
| 2019/0280508 A1* | 9/2019 | Tabib ................. G01R 31/3842 |
| 2019/0372928 A1* | 12/2019 | Chien ................. H04L 61/2015 |

FOREIGN PATENT DOCUMENTS

| | | |
|---|---|---|
| CN | 207652832 U | 7/2018 |
| TW | 534523 | 5/2003 |
| TW | M486208 U | 9/2014 |

\* cited by examiner

UNINTERRUPTIBLE POWER SYSTEM

CROSS-REFERENCE TO RELATED PATENT APPLICATION

This application claims the benefit of priority to Taiwan Patent Application No. 108118218, filed on May 27, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an uninterruptible power system, and more particularly to an uninterruptible power system with a detachable module.

BACKGROUND OF THE DISCLOSURE

Uninterruptible power systems are necessary to be configured near mains sockets. However, most of the mains sockets are arranged at a bottom side of activity spaces, which is convenient for the wiring and provides an aesthetic appearance. However, this arrangement makes it difficult for a user to observe the operation state of the uninterruptible power system.

Therefore, it is an important issue in the industry to provide an uninterruptible power system where the operation states can be easily observed.

SUMMARY OF THE DISCLOSURE

In response to the above-referenced technical inadequacies, the present disclosure provides an uninterruptible power system. The uninterruptible power system is electrically connected to a host computer. The uninterruptible power system includes a power converting engine, a UPS control circuit, and a control display circuit. The power converting engine includes an AC input interface, an AC output interface, and a DC output interface. The power converting engine receives a first AC voltage, and converts the first AC voltage to a first DC voltage and a second AC voltage. The DC output interface outputs the first DC voltage. The AC outputs the second AC voltage. The AC input interface receives the first AC voltage. The UPS control circuit includes a control input interface and a control output interface. The UPS control circuit is electrically connected to the power converting engine through the control input interface and the DC output interface. The UPS control circuit includes a first USB interface receiving the first DC voltage through the control input interface, a second USB interface receiving the first DC voltage through the control input interface, a first controller electrically connected to the power converting engine through the control input interface, and a plurality of indicators for indicating operational statuses of the power converting engine. The first controller drives the indicators through a display driver. The control display circuit includes a display input interface electrically connected to the control output interface of the UPS control circuit. The control display circuit at least includes a display unit for displaying at least one operation parameter of each of the power converting engine and the host computer. The control display circuit is detachable, the control display circuit is detachably mounted on the UPS control circuit through at least a connection between the control output interface and the display input interface. When the control display circuit is detached from the UPS control circuit, the control display circuit communicates with the UPS control circuit in a wireless communication manner.

Therefore, the control display circuit of the present disclosure is detachably disposed on the power converting engine and the UPS control circuit. When the control display circuit is separately disposed, the control display circuit can communicate with the UPS control circuit in a wireless manner. The user can arrange the control display circuit at an available position without being limited by space. The uninterruptable power system is configured close to the mains socket, so that the user can monitor the operation state of the uninterruptible power system. The uninterruptible power system of the present disclosure can also effectively monitor the temperature and power consumption of the connected host computer, which not only saves time, but also improves the monitoring efficiency for the user.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
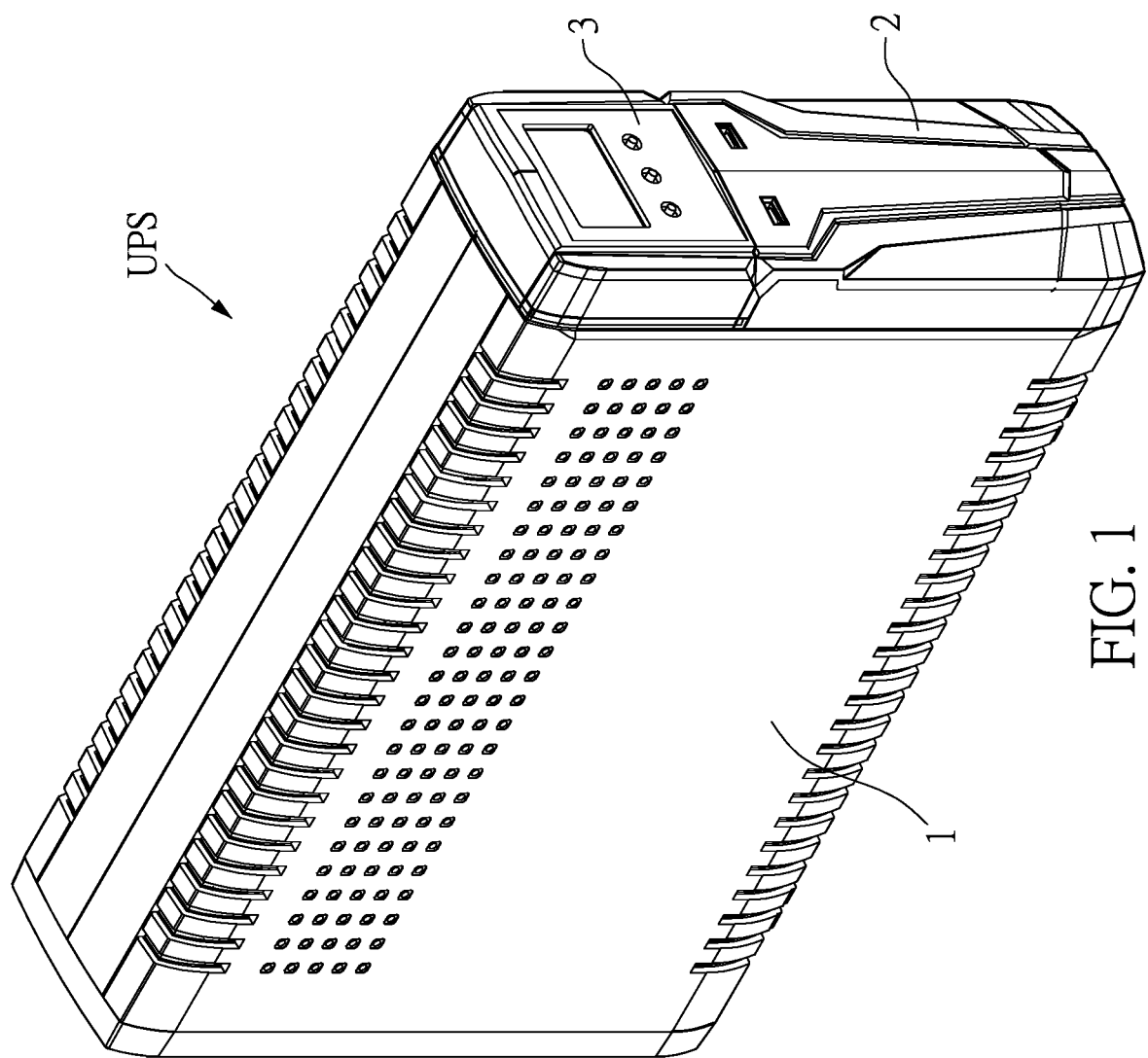
FIG. 1 is a schematic diagram of an uninterruptible power system of an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
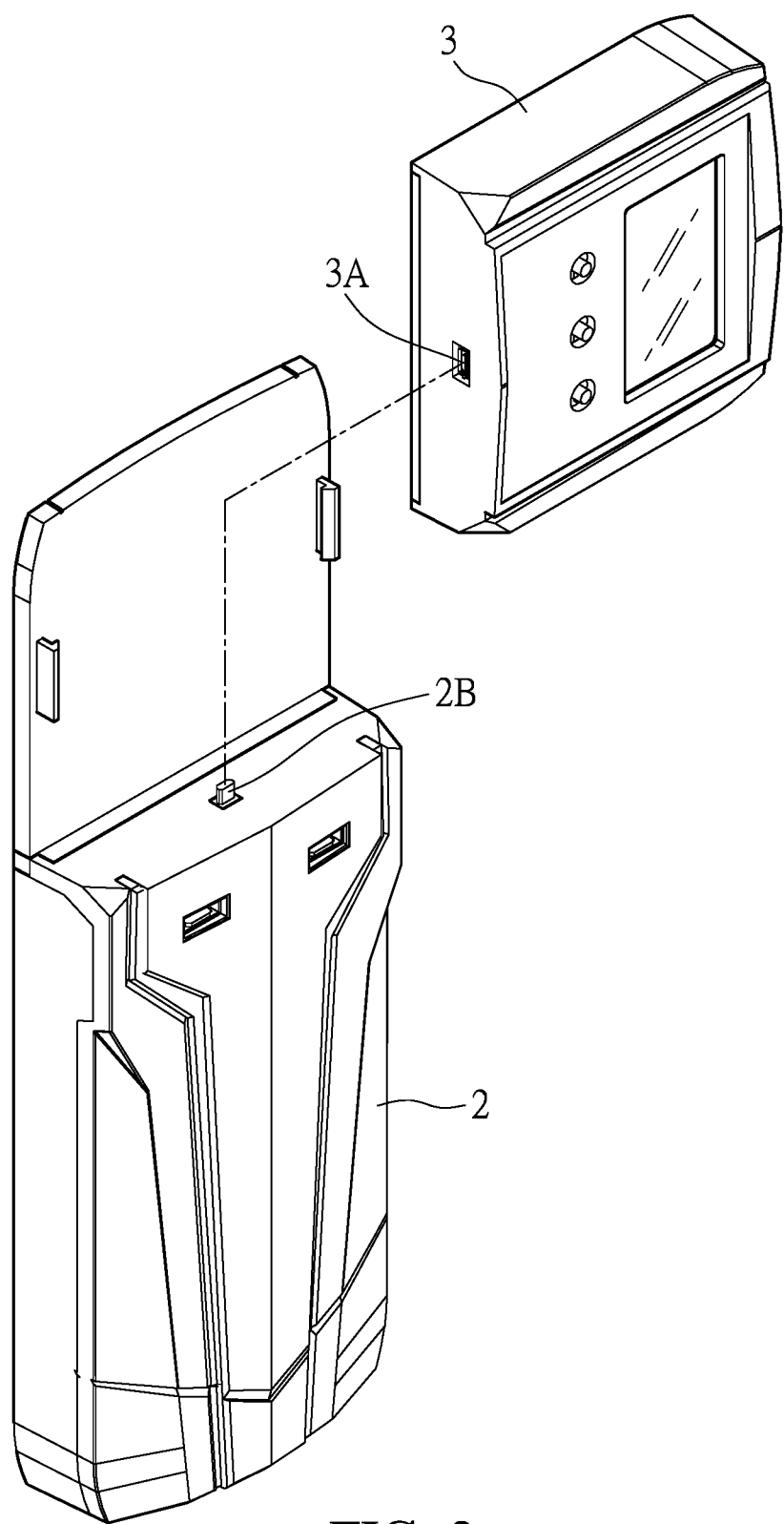
FIG. 2 is a schematic diagram of a UPS control circuit and a control display circuit of the embodiment of the present disclosure.
Figure 3:
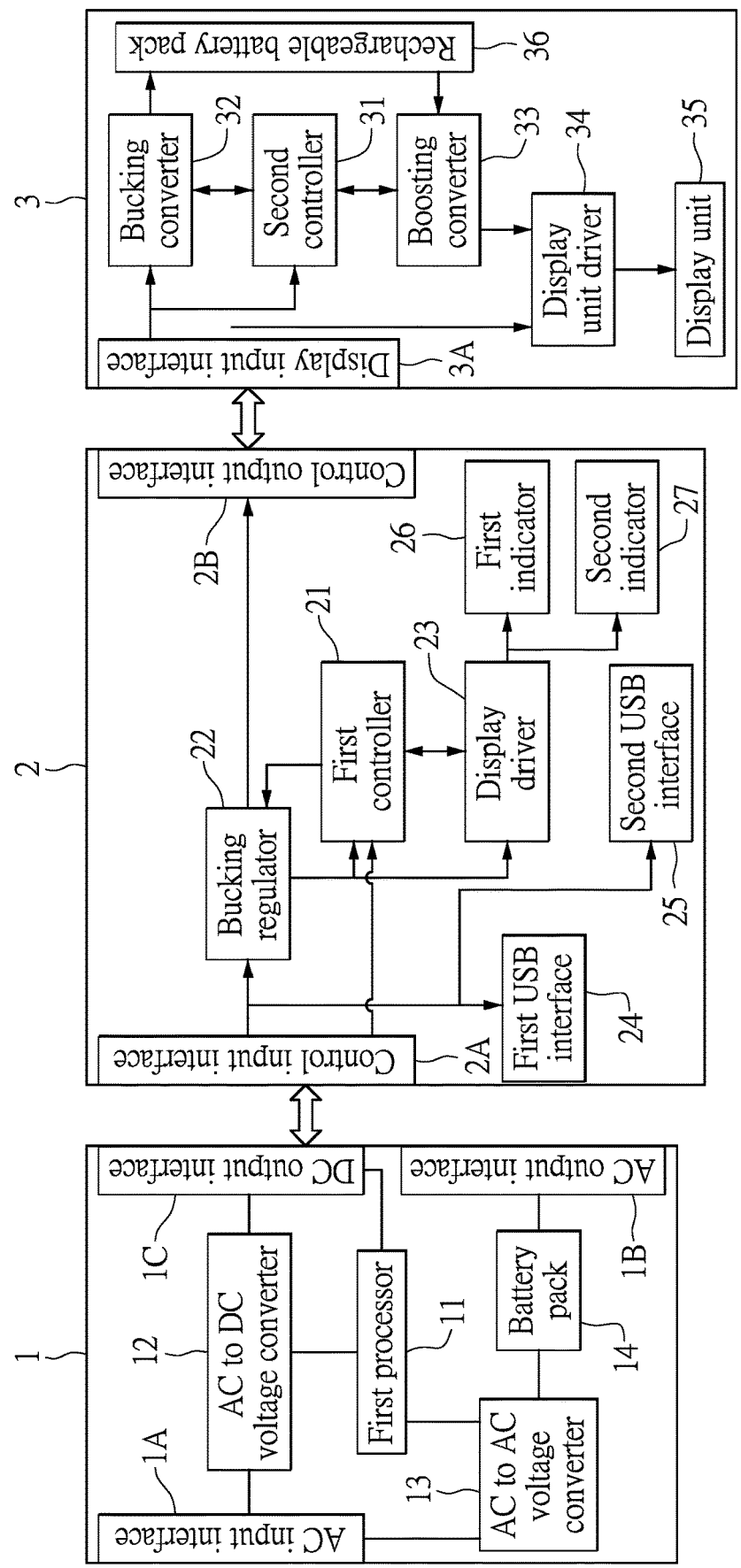
FIG. 3 is a block diagram of the uninterruptible power system of the embodiment of the present disclosure.

Referring to FIG. 1, FIG. 2, and FIG. 3, FIG. 1 is a schematic diagram of an uninterruptible power system of an embodiment of the present disclosure. FIG. 2 is a schematic diagram of a UPS control circuit and a control display circuit of the embodiment of the present disclosure. FIG. 3 is a block diagram of the uninterruptible power system of the embodiment of the present disclosure.

The uninterruptible power system UPS is a device that provides backup AC power to the electrical equipment to maintain normal operation of the electrical equipment when the mains grid is abnormal (such as power failure, low voltage, interference or surge current). In the embodiment, the uninterruptible power system UPS includes a power converting engine 1, a UPS control circuit 2, and a control display circuit 3.

The control display circuit 3 is mounted on the UPS control circuit. The control display circuit 3 and the UPS control circuit 2 are mounted on one side of the power converting engine 1. In the embodiment, the power converting engine 1 is a box-shaped host. The uninterruptible power system UPS is electrically connected to a host computer (not shown).

The power converting engine 1 includes an AC input interface 1A, an AC input output interface 1B, and a DC output interface 1C. The power converting engine 1 is used for receiving a first AC voltage, and at least converts the first AC voltage to a first DC voltage and a second AC voltage. In the embodiment, a main difference between the first AC voltage and the second AC voltage is the stability of the voltage and the current thereof. The amplitude and the frequency of the first AC voltage and the second AC voltage can be designed based on practical requirements, and is not limited in the present disclosure.

In the embodiment, the first AC voltage is an AC voltage of the mains grid, and the voltage range is between 100 VAC and 240 VAC. In other embodiments, the first AC voltage is adjusted according to practical requirements, and is not limited in the present disclosure. The AC output interface is used to output a second AC voltage. The DC output interface is used to output the first DC voltage.

The power converting engine 1 further includes a first processor 11, an AC to DC voltage converter 12, an AC to AC voltage converter 13, and a battery pack 14.

The AC to AC voltage converter 13 is electrically connected to the first processor 11, the AC input interface 1A, and the battery pack 14. The AC to DC voltage converter 12 is electrically connected to the first processor 11, the AC input interface 1A, and the DC output interface 1C. The first processor 11 is electrically connected to the AC to DC voltage converter 12, the AC to AC voltage converter 13, and the DC output interface 1C. The battery pack 14 is electrically connected to the AC to AC voltage converter 13 and the AC output interface 1B.

The UPS control circuit 2 includes a control input interface 2A and a control output interface 2B. The UPS control circuit 2 is electrically connected to the power converting engine 1 through the control input interface 2A and the DC output interface 1C.

The UPS control circuit 2 includes a first controller 21, a buck regulator 22, a display driver 23, a first USB interface 24, a second USB interface 25, a first indicator 26 and a second indicator 27.

The first USB interface 24 and the second USB interface 25 are defined at one side of the UPS control circuit 2 to connect with the other USB connector for providing power to an electronic device.

The first USB interface 24 and the second USB interface receive the first DC voltage through the control input interface 2A. In addition, in the embodiment, the first USB interface 24 is a Type-A USB interface, and the second USB interface 25 is a Type-C USB interface. However, in other embodiments, the first USB interface 24 and the second USB interface 25 may be a Type-A USB interface or a Type-C USB interface, and is not limited in the present disclosure. In other words, the first DC voltage is between 5V and 20V.

The first controller 21 is electrically connected to the power converting engine 1 through the control input interface 2A.

The first indicator 26 and the second indicator 27 are used to indicate the operational status of the power converting engine 1. The first indicator 26 and the second indicator 27 are LED indicators. In other words, the first indicator 26 and the second indicator 27 can indicate the operational status of the power converting engine 1 by color, brightness, blinking, or a message.

The first controller 21 is electrically connected to the bucking regulator 22 and the display driver 23. The bucking regulator 22 is electrically connected to the display driver 23, the control input interface 2A and the control output interface 2B. The display driver 23 is electrically connected to the first indicator 26 and the second indicator 27. In the embodiment, the first controller 21 drives the first indicator 26 and the second indicator 27 through the display driver 23. In addition, the number of indicators can be adjusted based on the practical requirements, and is not limited in the present disclosure.

The control display circuit 3 includes a display input interface 3A. The display input interface 3A is electrically connected to the control input interface 2B of the UPS control circuit 2.

The control display circuit 3 includes a second controller 31, a bucking converter 32, a boosting converter 33, a display unit driver 34, a display unit 35, and a rechargeable battery pack 36.

The bucking converter 32 is electrically connected to the second controller 31, the display input interface 3A, and the rechargeable battery pack 36. When the uninterruptible power system UPS operates in a normal mode and the control display circuit 3 is disposed on the UPS control circuit 2, the bucking converter 32 charges the rechargeable battery pack 36 until the battery pack 36 is fully charged.

The boosting converter 33 is electrically connected to the second controller 31 and the display unit driver. The display unit driver 34 is electrically connected to the display unit 35 and the boosting converter 33. The display unit driver 34 is for driving the display unit 35. The display unit 35 is used to display at least one operation parameter of the power converting engine 1 and the host computer (not shown). The rechargeable battery pack 36 is electrically connected to the bucking converter 32 and the boosting converter 33. In the embodiment, the rechargeable battery pack 36 is a lithium ion battery. In other embodiments, the rechargeable battery pack 36 can be other rechargeable batteries, such as a nickel-hydrogen battery, and is not limited in the present disclosure. In the embodiment, the rechargeable battery pack 36 further includes a wireless charging coil (not shown) to receive a wireless charging power.

The control display circuit 3 is a detachable unit. The control display circuit 3 is detachably mounted on the UPS control circuit 2 at least by mutual engagement of the control output interface 2B and the display input interface 3A. In other words, the control display circuit 3 can be removed and placed at a position that can be easily seen by the user. The control display circuit 3 is not necessary to be placed at a position near the mains socket with the uninterruptible power system UPS. In addition, when the control display circuit 3 is separated from the UPS control circuit 2, the control display circuit 3 can communicate with the UPS control circuit 2 in a wireless manner. The control display circuit 3 communicates with the UPS control circuit 2 via a Bluetooth communication protocol or a Wi-Fi wireless communication protocol.

Furthermore, when the control display circuit 3 is separated from the UPS control circuit 2, the control display circuit 3 can connect to a DC power supply through the display input interface 3A. In addition, the control display circuit 3 can obtain electric power by the rechargeable battery pack 36. Furthermore, the control display circuit 3 can be charged in a wireless charging manner to obtain power.

Figure 4:
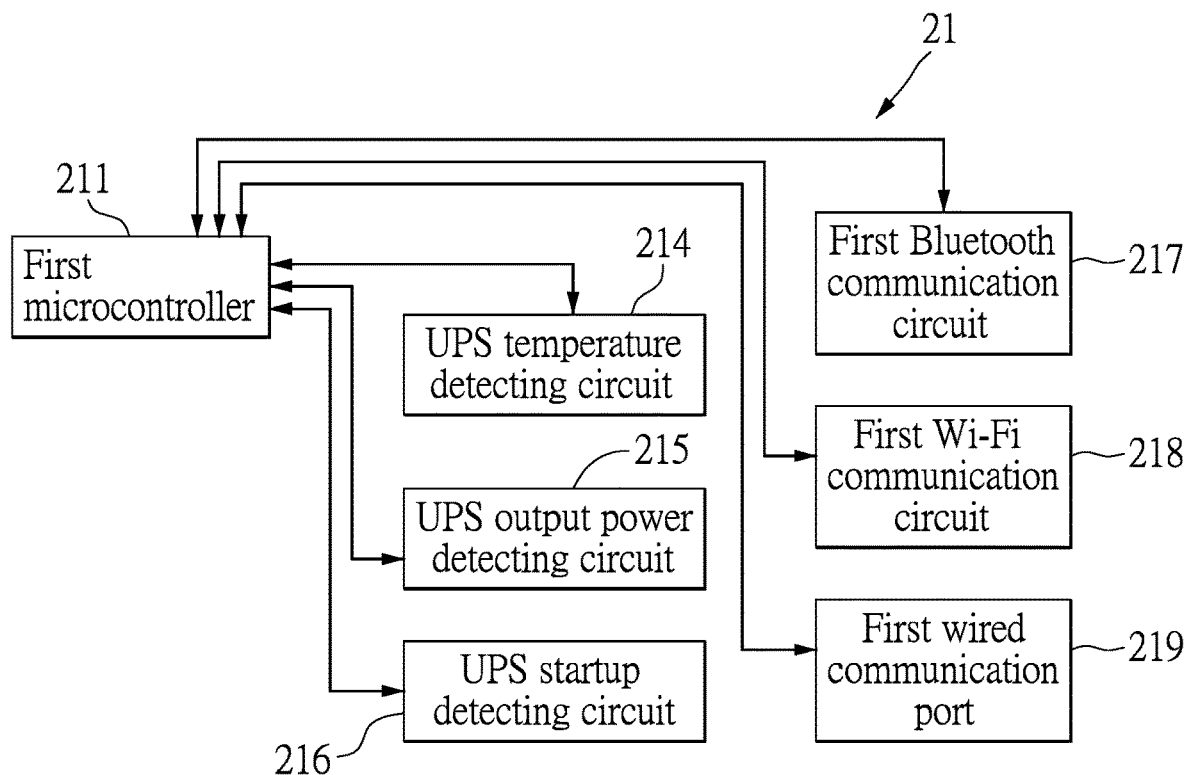
FIG. 4 is a block diagram of a first controller of the embodiment of the present disclosure.
Figure 5:
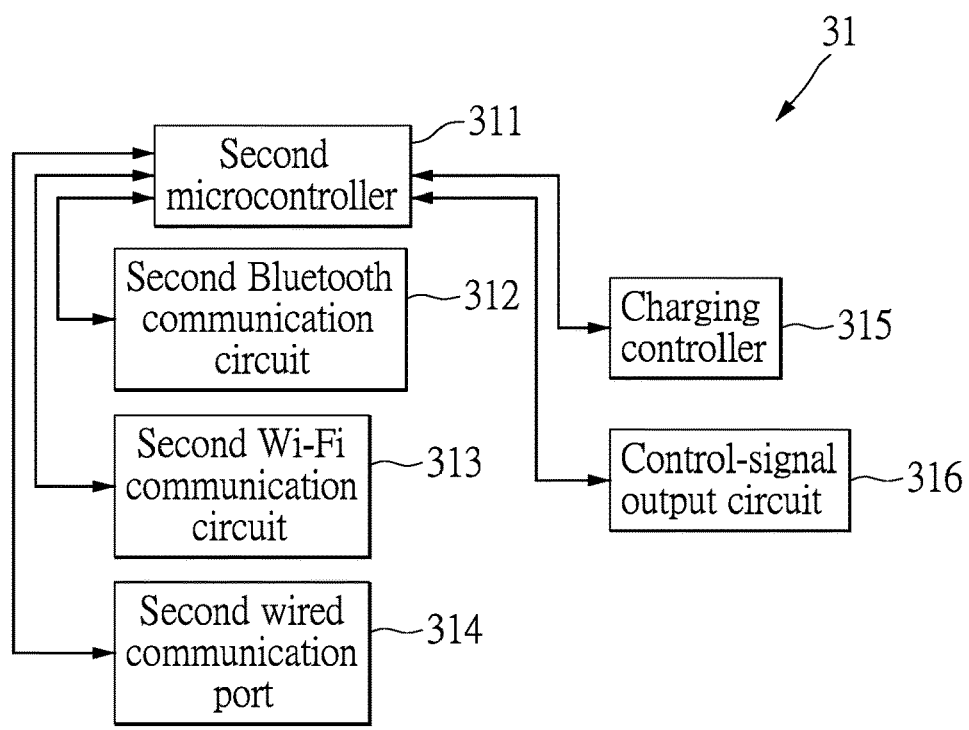
FIG. 5 is a block diagram of a second controller of the embodiment of the present disclosure.

Referring to FIG. 4 and FIG. 5, FIG. 4 is a block diagram of a first controller of the embodiment of the present disclosure. FIG. 5 is a block diagram of a second controller of the embodiment of the present disclosure.

The first controller 21 includes a first microcontroller 211, a UPS temperature detecting circuit 214, a UPS output power detecting circuit 215, a UPS startup detecting circuit 216, a first Bluetooth communication circuit 217, a first Wi-Fi communication circuit 218, and a first wired communication port 219.

The first microcontroller 211 is electrically connected to the UPS temperature detecting circuit 214, the UPS output power detecting circuit 215, the UPS startup detection circuit 216, the first Bluetooth communication circuit 217, the first Wi-Fi communication circuit 218, and the first wired communication port 219.

The UPS temperature detecting circuit 214 is configured to detect at least one temperature value in the power converting engine 1. The UPS output power detection circuit 215 is configured to detect at least one output power value of the power converting engine 1. The UPS startup detection circuit 216 is configured to detect an operational state of the power converting engine 1. The first Bluetooth communication circuit 217 is used for communicating with the control display circuit 3. The first Wi-Fi communication circuit 218 is used for communicating with the control display circuit 3. The first wired communication port 219 is electrically connected to the control output interface 3A. In the embodiment, the first wired communication port 219 is electrically connected to the control output interface 2B. In other embodiments, the first wired communication port 219 can be integrated with the control output interface 2B, and is not limited in the present disclosure. In the embodiment, the display input interface 3A is a USB female connector, and the control output interface 2B is a USB male connector.

In this embodiment, the uninterruptible power system UPS can obtain the motherboard temperature or the display card temperature of the host computer (not shown) through a communicative connection. In addition, at least one temperature sensor can be disposed in the host computer (not shown) to transmit the temperature data in the host computer (not shown) by a wire/wireless communication.

The second controller 31 includes a second microcontroller 311, a second Bluetooth communication circuit 312, a second Wi-Fi communication circuit 313, a second wired communication port 314, a charging controller 315 and a control-signal output circuit 316.

The second microcontroller 311 is electrically connected to the second Bluetooth communication circuit 312, the second Wi-Fi communication circuit 313, the second wired communication port 314, the rechargeable battery pack charging controller 315, and the control-signal output circuit 316.

The second Bluetooth communication circuit 312 is used for being communicatively connected with the first Bluetooth communication circuit 217. The second Wi-Fi communication circuit 313 is used to communicatively connect the first Wi-Fi communication circuit 218. The rechargeable battery pack charging controller 315 is used to control charging and discharging of the rechargeable battery pack 36 that controls the display circuit 3. The control-signal output circuit 316 is electrically connected to the plurality of buttons on the control display circuit 3 for receiving signals of the plurality of buttons to output a corresponding plurality of control signals.

The second wired communication port 314 is electrically connected to the display input interface 3A. In other embodiments, the second wired communication port 314 and the display input interface 3A may be integrated. In this embodiment, the display input interface 3A is a USB female, and the control output interface 2B is a USB male. In this embodiment, the display unit 35 is a touch screen.

In the embodiment, when the control display circuit 3 is separated from the UPS control circuit 2, the user can select either the Bluetooth communication protocol or the Wi-Fi communication protocol for communicative connection between the control display circuit 3 and the UPS control circuit 2. In addition, the display unit 35 of the control display circuit 3 can display the power consumption of the power conversion engine host 1 of the uninterruptible power system UPS, the internal temperature, the startup state of the uninterruptible power system, the power consumption of the connected host computer, the power of the control display circuit 3 and communicative connections of the control display circuit.

In conclusion, the control display circuit of the present disclosure is detachably disposed on the power converting engine and the UPS control circuit. When the control display circuit is separately disposed, the control display circuit can communicate with the UPS control circuit in a wireless manner. The user can place the control display circuit at an available position without being limited by space. The uninterruptable power system is placed close to the mains socket, so that the user can monitor the operation state of the uninterruptible power system. The uninterruptible power system of the present disclosure can also effectively monitor the temperature and power consumption of the connected host computer, which not only saves time but also improves the monitoring efficiency of the user.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An uninterruptible power system, electrically connected to a host computer, the uninterruptible power system comprising:
    a power converting engine including an AC input interface, an AC output interface, and a DC output interface, the power converting engine receiving a first AC voltage and converting the first AC voltage to a first DC voltage and a second AC voltage, the DC output interface outputting the first DC voltage, the AC output interface outputting the second AC voltage, the AC input interface receiving the first AC voltage;
    a UPS control circuit including a control input interface and a control output interface, the UPS control circuit electrically connected to the power converting engine through the control input interface and the DC output interface, the UPS control circuit including:
        a first USB interface receiving the first DC voltage through the control input interface;
        a second USB interface receiving the first DC voltage through the control input interface;
        a first controller electrically connected to the power converting engine through the control input interface; and
        a plurality of indicators for indicating operational statuses of the power converting engine, the first controller driving the indicators through a display driver; and
    a control display circuit including a display input interface, the display input interface being electrically connected to the control output interface of the UPS control circuit, the control display circuit at least including a display unit for displaying at least one operation parameter of each of the power converting engine and the host computer;
    wherein the control display circuit is detachable, the control display circuit is detachably mounted on the UPS control circuit through at least a connection between the control output interface and the display input interface;
    wherein when the control display circuit is detached from the UPS control circuit, the control display circuit communicates with the UPS control circuit in a wireless communication manner;
    wherein the first controller includes:
    a first micro-controller;
    a UPS temperature detecting circuit detecting at least one temperature value of the power converting engine;
    a UPS output power detecting circuit detecting at least one output power value of the power converting engine;
    a UPS startup detecting circuit detecting an operation state of the power converting engine;
    a first Bluetooth communication circuit communicating with the control display circuit;
    a first Wi-Fi communication circuit communicating with the control display circuit; and
    a first wired communication port electrically connected to the control display circuit;
    wherein the first micro-controller is electrically connected to the UPS temperature detecting circuit, the UPS output power detecting circuit, the UPS startup detecting circuit, the first Bluetooth communication circuit, the first Wi-Fi communication circuit, and the first wired communication connector.

2. The uninterruptible power system of claim 1, wherein the control display circuit communicates with the UPS control circuit by a Bluetooth communication protocol or a Wi-Fi communication protocol.

3. The uninterruptible power system of claim 1, wherein the first USB interface is a Type-A USB connector or a Type-C USB connector, and the second USB interface is a Type-A USB connector or a Type-C USB connector.

4. The uninterruptible power system of claim 1, wherein the power converting engine includes:
    a first processor;
    an AC to AC voltage converter electrically connected to the first processor and the AC input interface;
    an AC to DC voltage converter electrically connected to the first processor, the AC input interface, and the DC output interface; and
    a battery pack electrically connected to the AC to AC voltage converter and the AC output interface.

5. The uninterruptible power system of claim 4, wherein the UPS control circuit further includes:
    a bucking regulator, the first controller being electrically connected to the bucking regulator and the display driver, the bucking regulator being electrically connected to the control input interface and the control output interface.

6. The uninterruptible power system of claim 5, wherein the control display circuit further includes:
    a second controller;
    a bucking converter electrically connected to the second controller and the display input interface;
    a boosting converter electrically connected to the second controller;
    a display unit driver electrically connected to the display unit and the boosting converter for driving the display unit; and
    a rechargeable battery pack electrically connected to the bucking converter and the boosting converter.

7. The uninterruptible power system of claim 6, wherein the second controller includes:
    a second micro-controller;
    a second Bluetooth communication circuit communicating with the first Bluetooth communication circuit;
    a second Wi-Fi communication circuit communicating with the second Wi-Fi communication circuit;
    a charging controller for controlling a charging state or a discharging state of the rechargeable battery pack of the control display circuit; and
    a control-signal output circuit outputting multiple control signals;
    wherein the second micro-controller is electrically connected to the second Bluetooth communication circuit, the second Wi-Fi communication circuit, the charging controller, and the control-signal output circuit.

8. The uninterruptible power system of claim 7, wherein the display unit is a touch screen.

9. The uninterruptible power system of claim 8, wherein the rechargeable battery pack is charged in a wired charging manner or in a wireless charging manner.

\* \* \* \* \*